US007236489B1

(12) United States Patent
Wyatt

(10) Patent No.: US 7,236,489 B1
(45) Date of Patent: Jun. 26, 2007

(54) PORT PACKET QUEUING

(75) Inventor: Richard M. Wyatt, Ottawa (CA)

(73) Assignee: MOSAID Technologies, Inc., Kanata, Ontario (CA)

( * ) Notice: Subject to any disclaimer, the term of this patent is extended or adjusted under 35 U.S.C. 154(b) by 0 days.

(21) Appl. No.: 09/559,190

(22) Filed: Apr. 27, 2000

(51) Int. Cl.
 *H04L 12/50* (2006.01)
(52) U.S. Cl. .................................. 370/392; 711/152
(58) Field of Classification Search ............... None
 See application file for complete search history.

(56) References Cited

U.S. PATENT DOCUMENTS

| 5,502,833 | A |   | 3/1996 | Byrn et al. |
| 5,524,265 | A |   | 6/1996 | Balmer et al. ............. 395/800 |
| 5,583,861 | A |   | 12/1996 | Holden |
| 5,689,505 | A |   | 11/1997 | Chiussi et al. |
| 5,838,915 | A |   | 11/1998 | Klausmeier et al. |
| 5,898,687 | A | * | 4/1999 | Harriman et al. ........... 370/390 |
| 6,021,132 | A |   | 2/2000 | Muller et al. |
| 6,021,325 | A | * | 2/2000 | Hall ......................... 455/412.1 |
| 6,128,654 | A | * | 10/2000 | Runaldue et al. .......... 709/219 |

FOREIGN PATENT DOCUMENTS

| EP | 897 154 A2 | 2/1999 |
| WO | WO 96/31820 | 10/1996 |
| WO | WO 98/15155 | 4/1998 |
| WO | WO 98/36528 | 8/1998 |
| WO | WO 00/13091 | 3/2000 |

OTHER PUBLICATIONS

Yamanaka, H., et al., "Scalable Shared-Buffering ATM Switch with a Versatile Searchable Queue," *IEEE Journal on Selected Areas in Communications* 15(5): pp. 773-784 (Jun. 1997).
Saito, H., et al., "Multicast Function and its LSI Implementation in a Shared Multibuffer ATM Switch," *Proceedings of the 13th IEEE INFOCOM*, pp. 315-322 (Jun. 12-16, 1994).
Xiong, Y., et al., "Analysis of Multicast ATM Switching Networks Using CR WR Scheme," *Computer Networks and ISDN Systems* 30(8): pp. 835-854 (May 1998).

* cited by examiner

*Primary Examiner*—Doris H. To
*Assistant Examiner*—Robert Wilson
(74) *Attorney, Agent, or Firm*—Hamilton, Brook, Smith & Reynolds, P.C.

(57) ABSTRACT

A port queue includes a first memory portion having a first memory access time and a second memory portion having a second memory access time. The first memory portion includes a cache row. The cache row includes a plurality of queue entries. A packet pointer is enqueued in the port queue by writing the packet pointer in a queue entry in the cache row in the first memory. The cache row is transferred to a packet vector in the second memory. A packet pointer is dequeued from the port queue by reading a queue entry from the packet vector stored in the second memory.

14 Claims, 12 Drawing Sheets

PORT PACKET QUEUING

BACKGROUND OF THE INVENTION

A networking switch receives data packets from a number of ingress ports connected to the switch and provides the data packets to a number of egress ports connected to the switch. The switch determines the egress port to which the data packets are provided dependent on the destination address included in the data packet. A data packet received from an ingress port is stored in memory in the switch before being provided to the egress port.

The memory in the switch may be a common memory, in which all received data packets from all the ingress ports are stored, before being provided to the egress ports. A non-blocking switch allows all data received for all ingress ports to be provided to the egress ports. Non-blocking switches typically include a common memory in order to make the maximum amount of memory available to each port.

Typically, the switch includes a forwarding table implemented in forwarding logic in an ingress engine in the switch. The forwarding table is searched for a forwarding entry. The forwarding entry includes one or more egress ports to which the data packet is to be forwarded dependent on the destination address included in the received data packet.

As a received data packet is stored in the common memory, the location of the data packet in the common memory is stored in one or more egress port queues dependent on the selected forwarding entry. The egress port queues are stored in memory in the switch.

If the received data packet is an IP Multicast data packet, the location of the data packet in the common memory is written in the egress port queue associated with each port in the IP Multicast group. If the received data packet is a broadcast data packet, the location in the common memory is written in all egress port queues. Thus, dependent on the type of data packet received, the location of the data packet in the common memory; that is, a packet pointer may be enqueued on more than one egress port queue in the port cycle in which it is received. However, when transmitting the data packet from multiple queues, only one packet can be transmitted per port cycle. Thus, the location of the data packet in the common memory is dequeued from only one egress port queue per port cycle.

Thus the number of ports supported by the switch is limited by the speed at which the location of the data packet in the common memory can be enqueued on an egress port queue. A queue is typically implemented through a linked list in memory. Each entry in the linked list has two elements, a pointer element for storing the location of the data packet and a next pointer element for storing the location of the next entry on the linked list. Thus, two write accesses to memory are required to add the location of the data packet to the linked list, the first access writes the location of the data packet in common memory in the pointer element and the second access writes the location of the next entry in the next pointer element.

In a non-blocking switch, in which no received data packets are blocked by the switch, the memory speed is selected such that the location of a received data packet stored in common memory can be written to all the egress port queues in a port cycle. Also, a large queue is required in order to store pointers to IP Multicast and broadcast data packets stored in a common memory.

If the egress port queues are implemented in a linked list in Dynamic Random Access Memory ("DRAM") a large queue is provided but the number of pointers that can be enqueued for a received data packet is limited by the speed of the DRAM. The number of pointers that can be enqueued for a received data packet is increased by implementing egress port queues in a Static Random Access Memory ("SRAM") because SRAM is faster than DRAM. However, an SRAM cell is larger than a DRAM cell and therefore requires more area to provide a similar sized queue.

SUMMARY OF THE INVENTION

We present a queue with a fast enqueue. The queue includes a first memory having first memory access time and a second memory having a second memory access time. Control logic enqueues a pointer in the queue by writing the pointer to the first memory and transferring the pointer to the second memory. The first memory access time is less than the second memory access time. The first memory allows a pointer to be stored in multiple queues over multiple write cycles within a port cycle. Yet, the first memory can be relatively small since multiple pointers can be transferred together to the second memory from which only one pointer need be read per port cycle when dequeued.

The control logic enqueues the pointer in the first memory in a single write operation since a linked listed is not established until the pointers are transferred to the second memory.

The control logic may partially or fully fill a cache row in the first memory before transferring the cache row into the second memory in a single write operation. The entries in the cache row in the first memory are ordered by position in the cache row. The first memory preferably includes two cache rows.

A packet vector stored in the second memory may include a cache row entry and a count of the number of pointers stored in a cache row entry. The packet vector stored in the second memory may include a link to a next packet vector in the queue.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
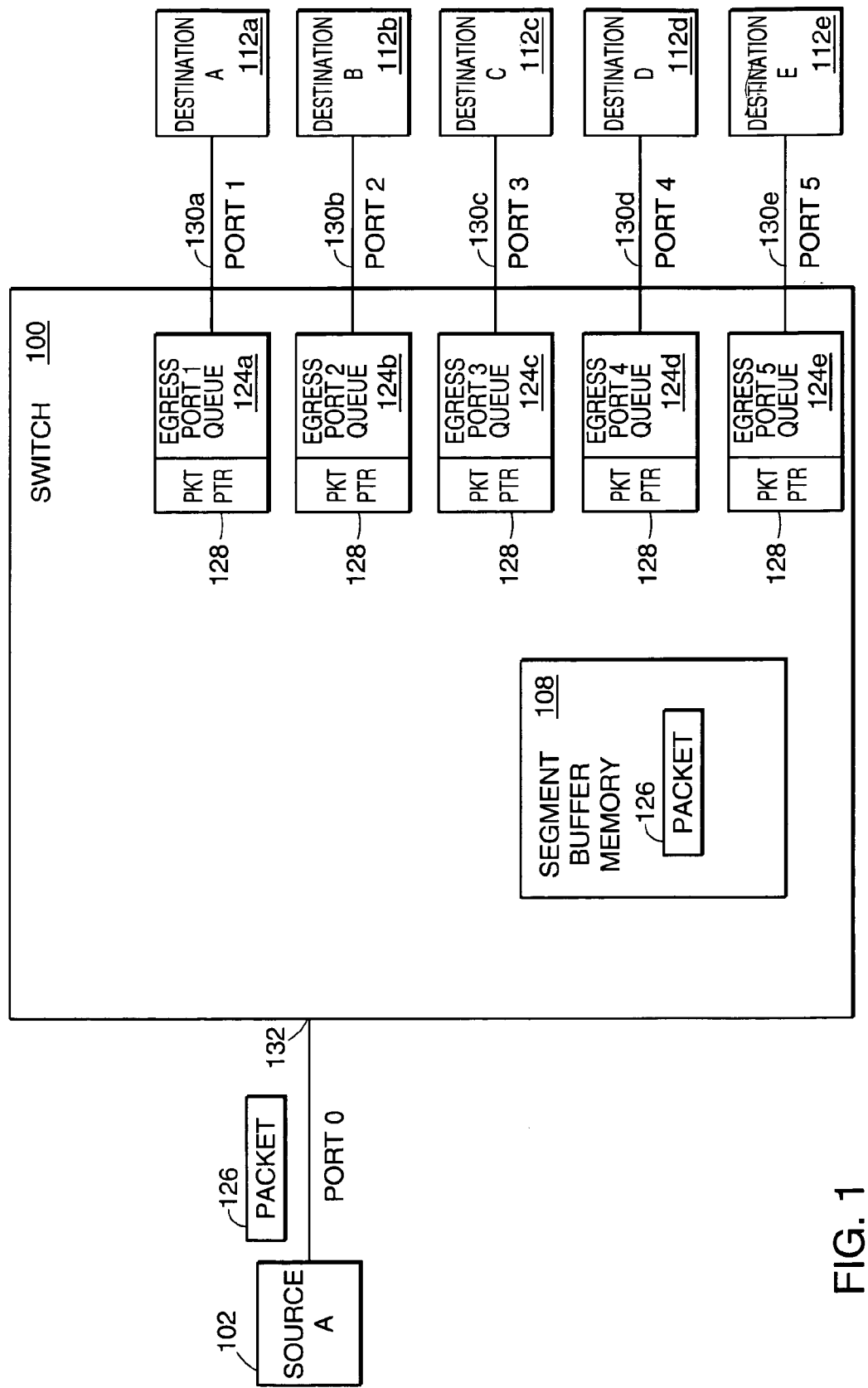
FIG. 1 is a block diagram of a switch including a plurality of port queues according to the principles of the present invention.

FIG. 1 illustrates a switch 100 including a plurality of egress port queues 124a–e according to the principles of the present invention. A source node 102 and destination nodes 112a–e are shown connected to the switch 100. A data packet 126 received by the switch 100 at an ingress port 132 from source node 102 is forwarded through egress ports 130a–e to one or more destination nodes 112a–d dependent on a destination address encoded in a header included in the data packet 126.

If the received data packet 126 is a broadcast data packet, the data packet 126 is forwarded to all destinations 112a–e. If the received data packet 126 is an IP Multicast data packet, the data packet 126 is forwarded to all members of the IP Multicast group which may include one or more of destinations 112a–e.

Upon receiving the data packet 126, the switch 100 first stores the data packet 126 in segment buffer memory 108. The switch 100 then determines from the data packet's header to which egress ports 130a–e the data packet is to be forwarded. Having determined the egress ports 130a–e, the switch 100 writes a pointer to the location of the data packet in segment buffer memory 108; that is a packet pointer 128 in the respective egress port queues 124a–e. The egress port queues 124a–e are implemented in a memory separate from the segment buffer memory 108. The packet pointer 128 is written to an egress port queue 124a–e if the data packet 126 is to be forwarded to the respective egress port 130a–e. As shown in FIG. 1, data packet 126 is a broadcast data packet and a packet pointer 128 for data packet 126 has been enqueued on each egress port queue 124a–e.

Thus, the packet pointer 128 may be enqueued in more than one egress port queue 124a–e per port cycle for a received data packet. However, the packet pointer is dequeued from only one of the egress port queues 124a–e per port cycle in order to transmit the data packet from the respective egress port 130a–e. Thus, the packet pointer 128 is enqueued on an egress port queue 124a–e faster than it is dequeued from the egress port queue 124a–e.

Figure 2:
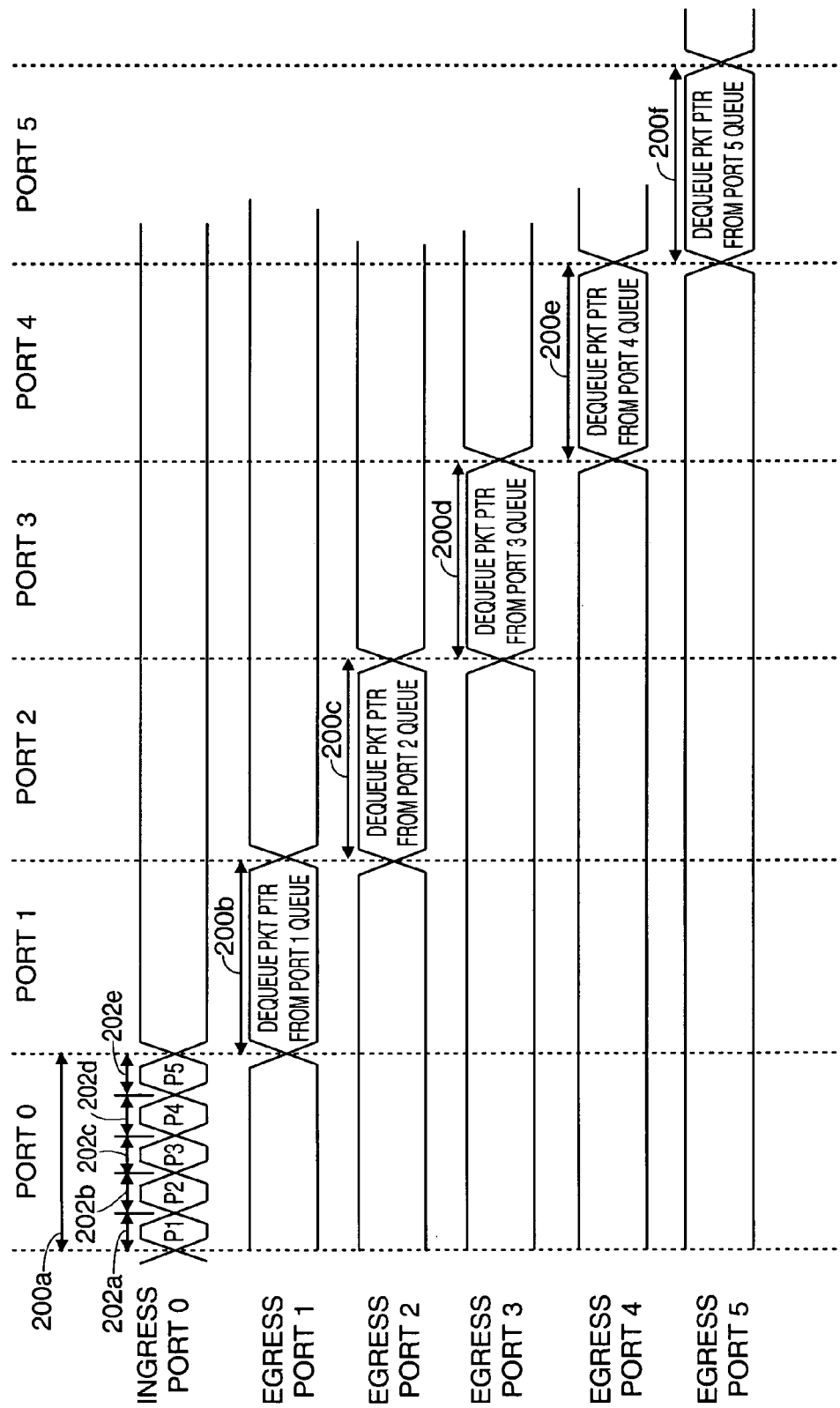
FIG. 2 is a timing diagram illustrating the enqueuing and dequeuing of packet pointers in the port queues shown in FIG. 1.

FIG. 2 is a timing diagram illustrating the enqueuing and dequeuing of packet pointers in the egress port queues 124a–e shown in FIG. 1. Each port in the switch 100 is allocated a fixed port cycle 200a–f in which to enqueue a packet pointer 128 by writing the packet pointer 128 at the tail of an egress port queue 124a–e or to dequeue a packet pointer 128 by reading the packet pointer 128 stored at the head of the egress port queue 124a–e Six port cycles 200a–f are shown in FIG. 2, one for each ingress port 132 and egress port 130a–e in the switch 100. Each port cycle 200a–f is further divided into enqueue cycles 202a–e. The number of enqueue cycles 202a–e is dependent on the number of egress port queues 124a–e in the switch 100. Thus, five enqueue cycles 202a–e, are provided one for each of the egress port queues 124a–e shown in FIG. 1.

A packet pointer may be enqueued on each egress port queue 124a–e in the switch 100 in enqueue cycles 202a–e in a port cycle 200a–e. However, only one packet pointer is dequeued from an egress port queue 124a–e in a port cycle 200a–e. Thus, a packet pointer enqueue cycle time must be faster than a packet pointer dequeue cycle time. In the example shown, the dequeue cycle time is five times slower than the enqueue cycle time. Therefore, a packet pointer is enqueued in fast memory; that is memory with a fast access time. However, because only one packet pointer is dequeued from the corresponding port queue 124a–e in each port cycle 200a–e, the packet pointers are dequeued from slow memory; that is, memory with a slower access time than the fast memory required for enqueuing the packet pointer.

Fast memory is preferably SRAM with a fast access time. However fast memory is not limited to SRAM. It may be any other memory with a sufficiently fast access time. For example, fast memory may be DRAM with a sufficiently fast access time.

Slow memory is preferably DRAM because a DRAM requires less gates than an SRAM. However, the slow memory is not limited to DRAM. It may be any other slow memory similar to DRAM. In an embodiment in which DRAM is used for both fast memory and slow memory, the slow memory time may be equal to the fast memory access time.

Figure 3:
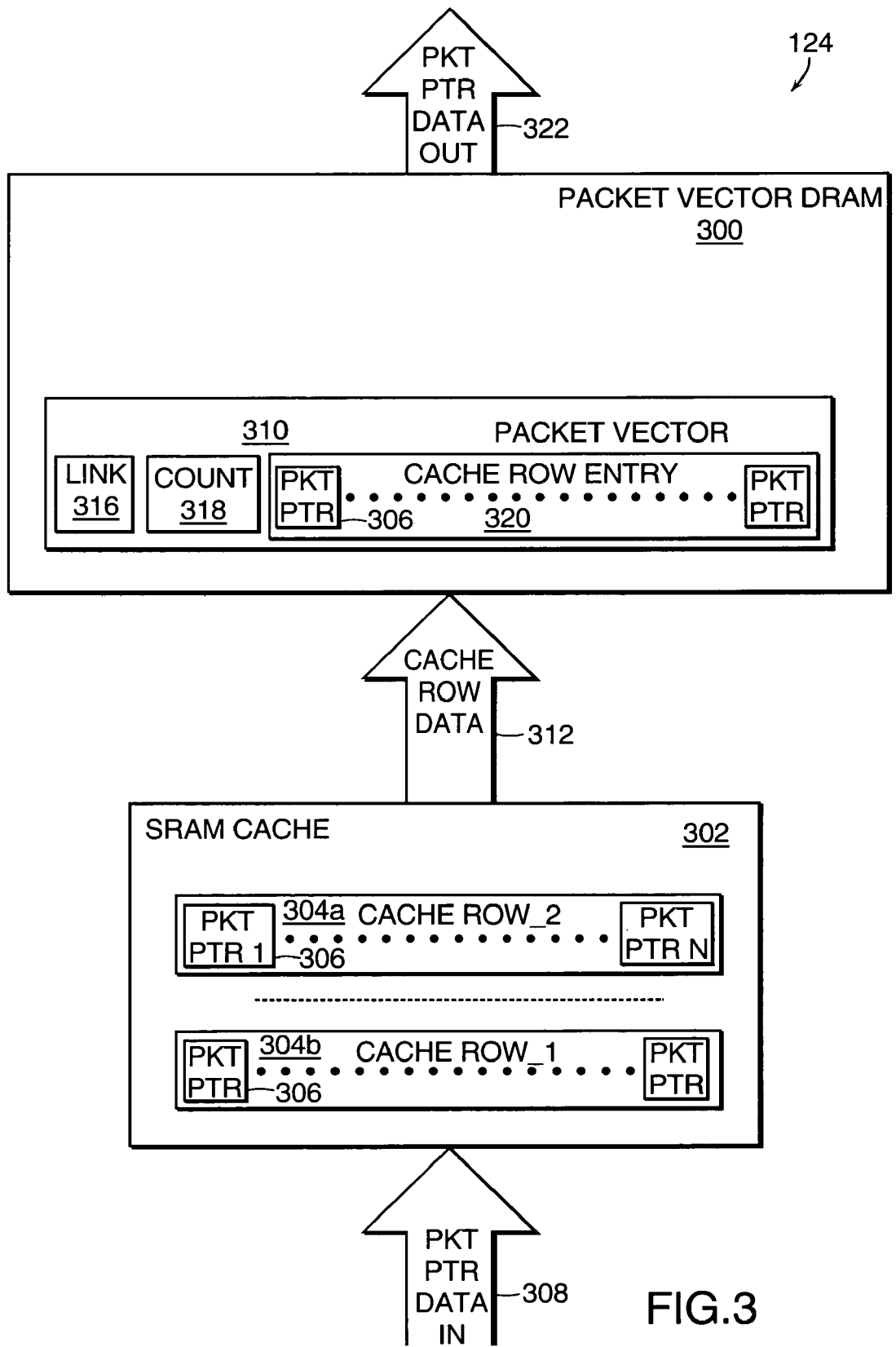
FIG. 3 is a block diagram of one of the port queues 124a–e shown in FIG. 1.

FIG. 3 is a block diagram of one of the port queues 124a–e shown in FIG. 1. The port queues 124a–e include slow memory and fast memory. The packet vector DRAM 300 is slow memory. The SRAM cache 302 is fast memory with a faster access time than the access time of the packet vector DRAM 300. In one embodiment the packet vector DRAM 300 is implemented in DRAM with a slow access time and the SRAM cache 302 is implemented in SRAM with a faster access time than the packet vector DRAM 300.

Packet pointers 128 are enqueued in the SRAM cache 302 and dequeued from the packet vector DRAM 300 in the same order in which the packets are received at the ingress port 132. The SRAM cache 302 includes two cache rows 304a–b. Each cache row 304a and 304b includes a plurality of packet pointer entries 306. A packet pointer 128 may be stored in a packet pointer entry 306.

After a received data packet 126 (FIG. 1) is stored in segment buffer memory 108 (FIG. 1), the packet pointer is forwarded to the egress port queue 124a–e on packet pointer data_in 308. The packet pointer 128 is written to the next sequential packet pointer entry 306 in the cache row 304a or 304b which is currently being filled.

Only one write cycle is necessary to enqueue the packet pointer 128 in a packet pointer entry 306 at the tail of the egress port queue 124a–e. No link pointer is necessary because the packet pointer 128 is written to the next sequential packet pointer entry 306. Thus, the packet pointers are ordered by position in the cache row 304a or 304b.

In an alternative embodiment, the SRAM cache 302 may be implemented in DRAM with an access time at least as fast as SRAM in order to reduce the size of the port queues 124*a–e*. The access time of packet vector DRAM 300 may be equal to the access time of the SRAM cache 302. The advantage implementing the port queue 124*a–e* with two separate DRAMs with the same access time is that a packet pointer can be added to the link list in a single memory access and an enqueue operation and dequeue operation can be performed in parallel by having a separate enqueue and dequeue memory.

The minimum enqueue cycle 202*a–e* (FIG. 2) is dependent on the minimum memory access cycle for the SRAM cache 302. For example, if a port cycle is 120 ns and SRAM cache 302 includes 5 egress port queues 124*a–e*, each enqueue cycle 202*a–e* is 120/5=24 ns and each dequeue cycle is 120 ns. In a dequeue cycle the packet pointer 128 is read and the pointer to the next packet pointer 128 is updated. Thus a read memory access cycle and a write memory access cycle is performed in each dequeue cycle requiring a packet vector DRAM 300 with a 60 ns memory access time. One write memory cycle access memory is performed in each enqueue cycle requiring an SRAM cache 302 with a 24 ns access time.

After a packet pointer 128 has been written to the last packet pointer entry 306 in the current cache row 304*a–b*; that is, the row is filled, the full current cache row 304*a* or 304*b* storing a plurality of packet pointers 128 is transferred to a cache row entry 320 in an empty packet vector 310 in packet vector DRAM 300 in a single transfer cycle. To transfer the current cache row 304*a* or 304*b* to packet vector DRAM 300, the current cache row 304*a* or 304*b* is read from SRAM cache 302, transferred on cache row data 312 to packet vector DRAM 300 and written in a cache row entry 320 in a packet vector 310 in packet vector DRAM 300.

The transfer of the current cache row 304*a* or 304*b* to packet vector DRAM 300 is performed using a single SRAM cache read cycle. Thus, a plurality of packet pointers 128 stored in packet pointer entries 306 in the current cache row 304*a* or 304*b* are transferred in a single SRAM cache read cycle. For example, if the current cache row 304*a* or 304*b* has twelve packet pointer entries 306 and each packet pointer entry 306 is 17 bits wide, 204 bits are transferred on cache row data 312 in a single transfer cycle. Only one transfer cycle is required to transfer twelve packet pointers 128 stored in the cache row 304*a* or 304*b*. Thus, the transfer of the current cache row 304*a* or 304*b* from SRAM cache 302 uses only a small portion of the bandwidth of the SRAM cache 302 and the packet vector DRAM 300.

While one cache row 304*a* or 304*b* is waiting to be transferred to packet vector DRAM 300, further packet pointers 128 can be enqueued in the other cache row 304*a* or 304*b*. Thus, a packet pointer 128 is individually enqueued in a packet pointer entry 306 in the SRAM cache 302 and a cache row 304*a–c* including a plurality of packet pointers 128 stored in packet pointer entries 306 is written to packet vector DRAM 300 in a single transfer cycle.

The packet vector 310 also includes a link field 316 and a count field 318. The count field 318 stores the number of packet pointers 128 stored in the cache row entry 320. The link field 316 is provided for storing a pointer to the next packet vector 310 in the linked list of packet vectors.

Thus, packet pointers 128 are enqueued in SRAM and dequeued in DRAM, allowing packet pointers 128 to be queued quickly in fast SRAM and stored in slow DRAM.

Figure 4:
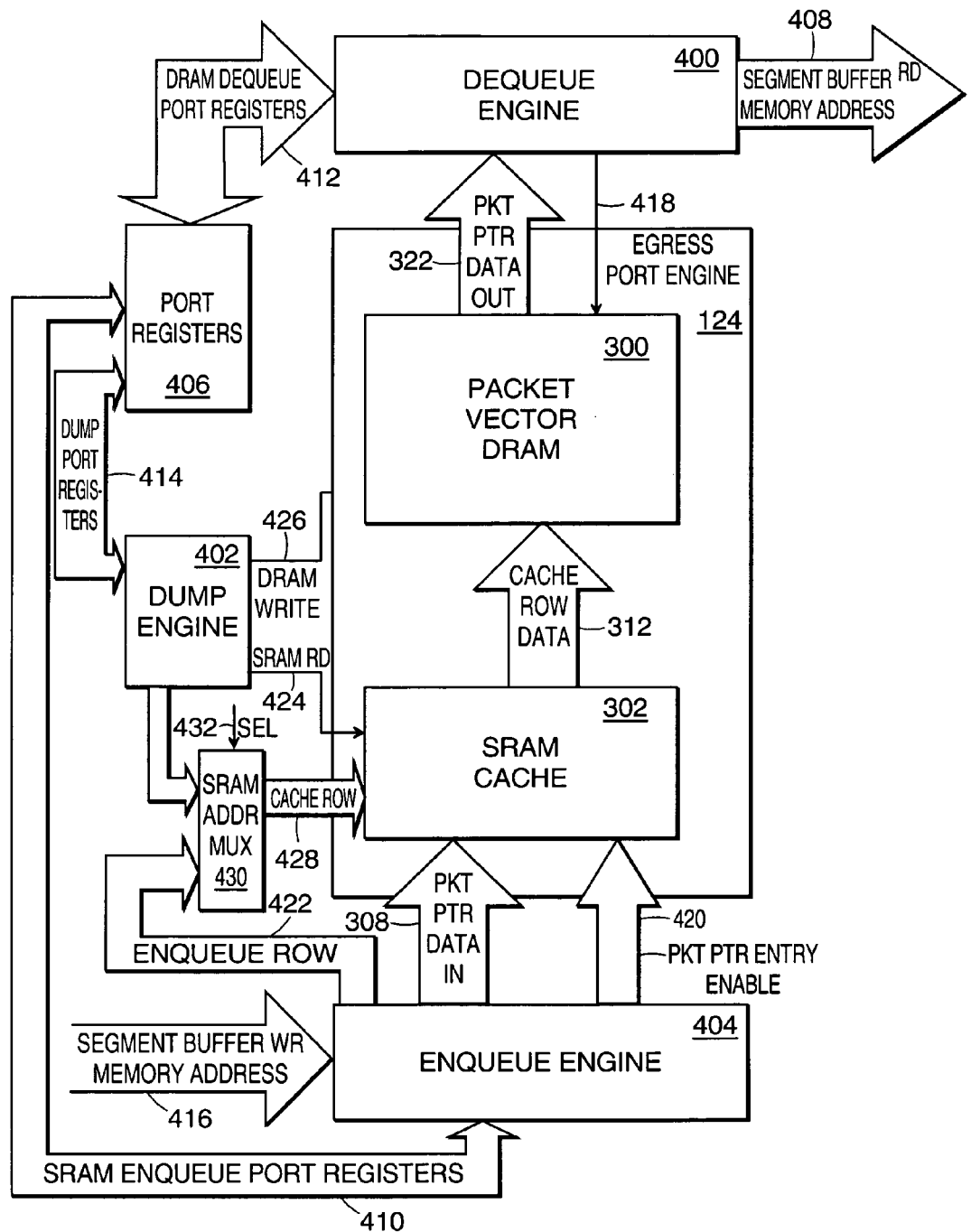
FIG. 4 is a block diagram including the port queue logic shown in FIG. 3 and associated logic for enqueuing, dequeuing, and transferring packet pointers in the port queue shown in FIG. 3.

FIG. 4 is a block diagram including the port queue 124 shown in FIG. 3 and associated control logic for enqueuing, dequeuing, and transferring packet pointers 128.

A set of port registers associated with the egress port queue 124 are stored in port registers 406. The port registers 406 are described in conjunction with FIG. 7. The set of port registers stored in port registers 406 are accessible by the enqueue engine 404 through SRAM enqueue port registers 410, by dump engine 402 through dump port registers 414 and by dequeue engine 400 through DRAM dequeue port registers 412.

The enqueue engine 404 controls the enqueuing of packet pointers 128 in SRAM cache 302. To enqueue, the enqueue engine 404 forwards the segment buffer write memory address 416 on packet pointer data_in 308. The enqueue engine writes the packet pointer data_in 308 in a packet pointer entry 306 (FIG. 3) in a cache row 304*a–b* in SRAM cache 302.

The enqueue engine 404 selects the cache row 304*a* or 304*b* in which to write the packet pointer entry dependent on the state of cache row 428. The state of cache row 428 is dependent on enqueue row 422 forwarded through SRAM address multiplexer 430. The state of enqueue row 422 is dependent on the state of port registers 406.

The enqueue engine 404 selects the packet pointer entry 306 in the cache row 304*a–b* dependent on packet pointer entry enable 420. The state of the packet pointer entry enable 420 is dependent on the state of the SRAM enqueue port registers 410.

The dump engine 402 controls the transferring of a cache row 304*a* or 304*b* from SRAM cache 302 to packet vector DRAM 300. To transfer, the dump engine 402 first performs a memory read cycle through SRAM_RD 424 to enable the contents of an SRAM cache row 304*a* or 304*b* (FIG. 3) in SRAM cache 302 to be forwarded on cache row data 312. Next, the dump engine 402 performs a memory write cycle through DRAM-WR 426 to enable cache row data 312 to be written into a cache row entry 320 (FIG. 3) in a packet vector 310 (FIG. 3) in a packet vector DRAM 300.

The dequeue engine 400 controls the dequeuing of packet pointers 128 from packet vector DRAM 300. To dequeue, the dequeue engine 400 reads a packet pointer 128 stored in a packet pointer entry 306 (FIG. 3) in a cache row field 320 (FIG. 3) in a packet vector 310 (FIG. 3) in packet vector DRAM 300 and forwards the packet pointer 128 on segment buffer read memory address 408.

Figure 5:
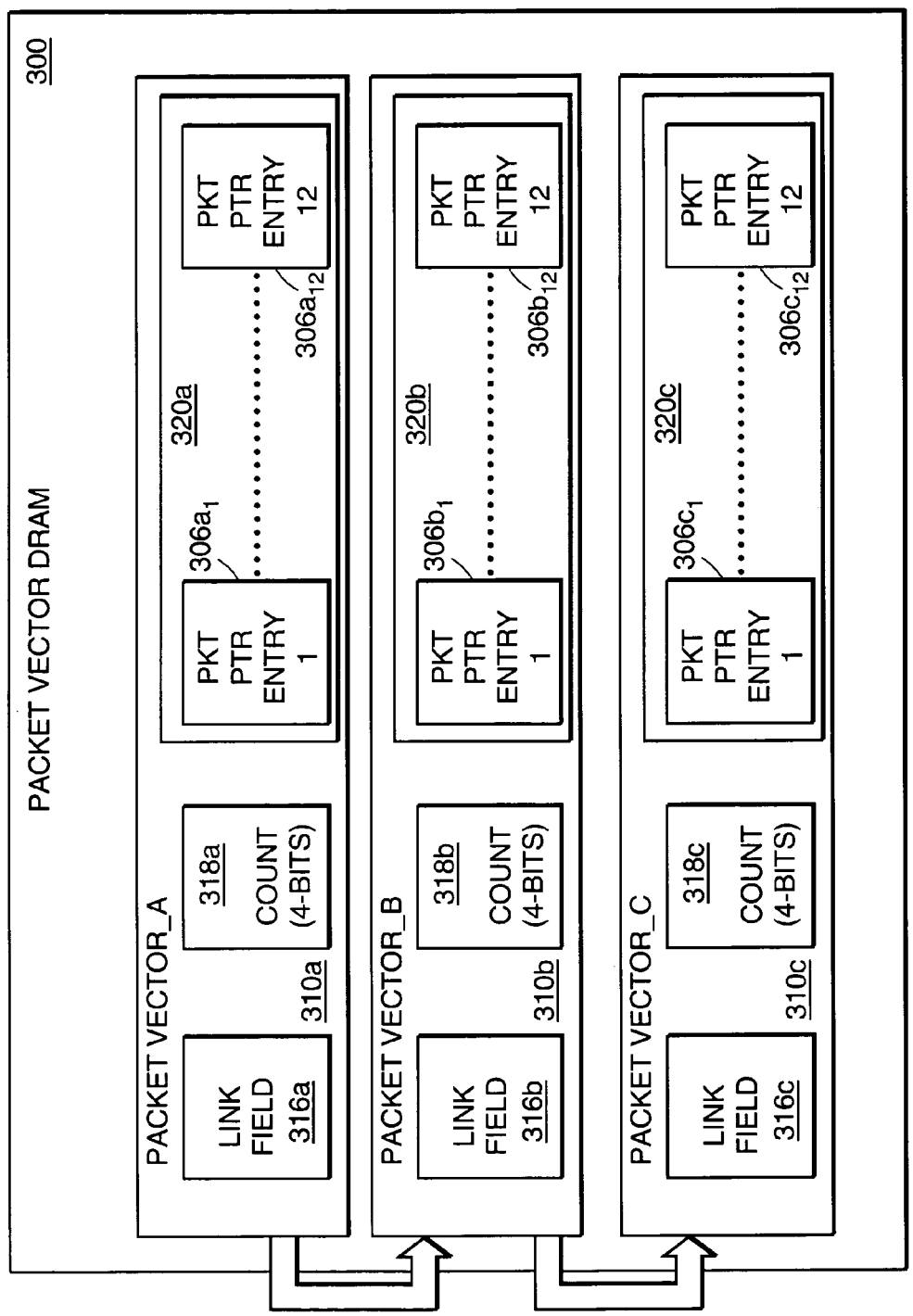
FIG. 5 is a block diagram illustrating a linked list of packet vectors in the packet vector DRAM shown in FIG. 3.

FIG. 5 is a block diagram illustrating a linked list of packet vectors 310*a–c* in the packet vector DRAM 300 shown in FIG. 3. The linked list includes three packet vectors 310*a–c*. Packet vector 310*a* is the first packet vector in the linked list. The link field 316*a* stores the address of next packet vector 310*b* in packet vector DRAM 300. Packet vector 310*b* is the second packet vector 310*b* in the linked list. The link field 316*b* in packet vector 310*b* stores the address of next packet vector 310*c* in packet vector DRAM 300. Packet vector 310*c* is the third packet vector in the linked list. The link field 316*c* in the packet vector 310*c* stores the address of the next packet vector 310 in packet vector DRAM 300 in which a cache row 304*a* or 304*b* may be written.

Packet vector 310*c* is the last packet vector 310 in the linked list even though it includes a pointer to the next packet vector because the contents of the count field 318, link field 316 and cache row entry 320 store invalid data. For example, the invalid data stored in the count field 318 may be zero indicating that there are no packet pointers 128 stored in the cache row entry 320. In order to add another packet vector to the linked list, the cache row entry 320, count field 318*a* and link field 316 of the next packet vector are written with valid data in a single packet vector DRAM memory write access.

Each cache row entry 320a–c in the packet vector 310a–c includes twelve packet pointer entries 306. The number of packet pointer entries 306 is not limited to twelve, the number of packet pointer entries 306 is dependent on the memory access time of the SRAM cache 302; that is, the time to transfer a cache row 304a or 304b to packet vector DRAM 300. By transferring twelve packet pointers 128 per transfer cycle instead of one packet pointer per transfer cycle reduces the band width of the SRAM cache 302 consumed by the transfer cycle and allows more port queues 124a–e to be provided in the same SRAM cache 302.

The size of the count field 318a–c is dependent on the number of packet pointer entries 306 in the cache row entry 320. For twelve packet pointer entries 306 the count field 318a–c is four bits wide. The size of the link field 316 is dependent on the size of packet vector DRAM 300. The link field 316 stores of a pointer to the next packet vector 310. With a 12-bit link field, the linked list may include up to 4096 packet vector entries 310.

One memory write operation to the packet vector DRAM 300 is required to add a packet vector 310 to the linked list because the next packet vector 310 has been prefetched and the address of the next packet vector 310 has been written in the link field 316 of the last packet vector 310 in the linked list. The write operation copies the cache row 304a–b (FIG. 3) in SRAM cache 302 (FIG. 3) to the cache row entry 320 in packet vector DRAM 300 and writes the number of packet pointers 128 stored in the cache row entry 320 into the count field 318. The number of packet pointers 128 stored in the cache row entry is also stored in the port registers 406 (FIG. 4). The port registers 406 are described later in conjunction with FIG. 7.

Figure 6:
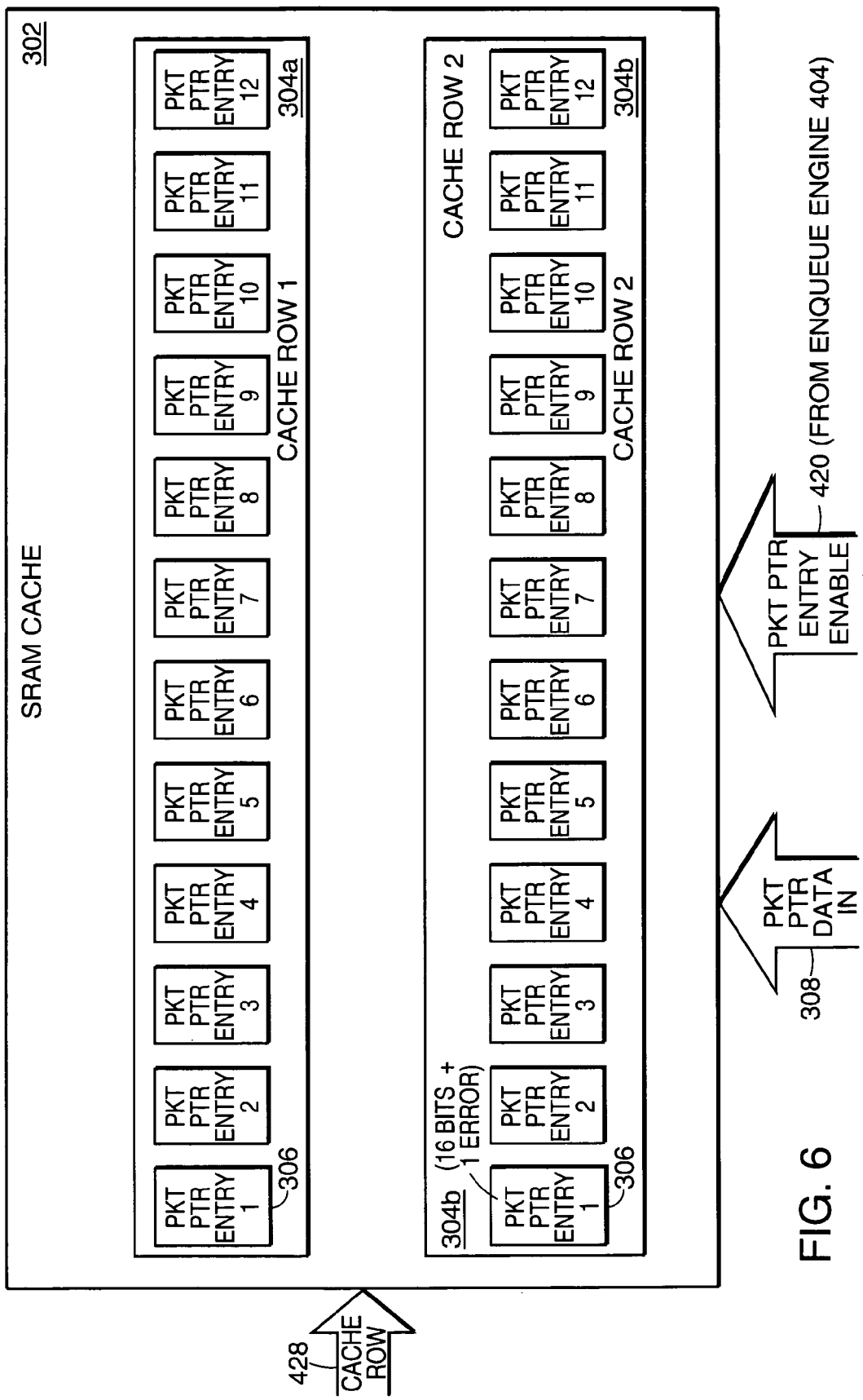
FIG. 6 is a block diagram of the SRAM cache, including 2 cache rows with each row including 12 packet pointer entries.

FIG. 6 is a block diagram of the SRAM cache 302 including two cache rows 304a and 304b with each cache row including 12 packet pointer entries 306. The enqueue engine 404 (FIG. 4) forwards the packet pointer 128 to be written to a packet pointer entry 306 on packet pointer data_in 308. The cache row 304a or 304b to which the packet pointer 128 is to be written in a packet pointer entry 306 is selected dependent on the state of cache row 428 forwarded through SRAM address multiplexer 430 (FIG. 4) from the enqueue engine 404. Having selected the cache row 304a or 304b in SRAM cache 302, the packet pointer entry enable 420 selects a packet pointer entry 306 in the selected cache row 304a–b. The packet pointer data_in 308 is written to the selected packet pointer entry 306 in the selected cache row 304a–b.

In one embodiment, the segment buffer memory 108 (FIG. 1) may store up to 65536 data packets, thus each packet pointer 128 is 16-bits wide. A one-bit error field (not shown) is stored with the 16-bit packet pointer 128 in a packet pointer entry 306. The state of the error bit determines whether the data packet stored in segment buffer memory 108 at the location specified by the packet pointer 128 is a valid data packet. With seventeen bits per packet pointer entry 306, the width of a cache row 304a–b is 204 bits (12 packet pointers×17 bits).

Figure 7:
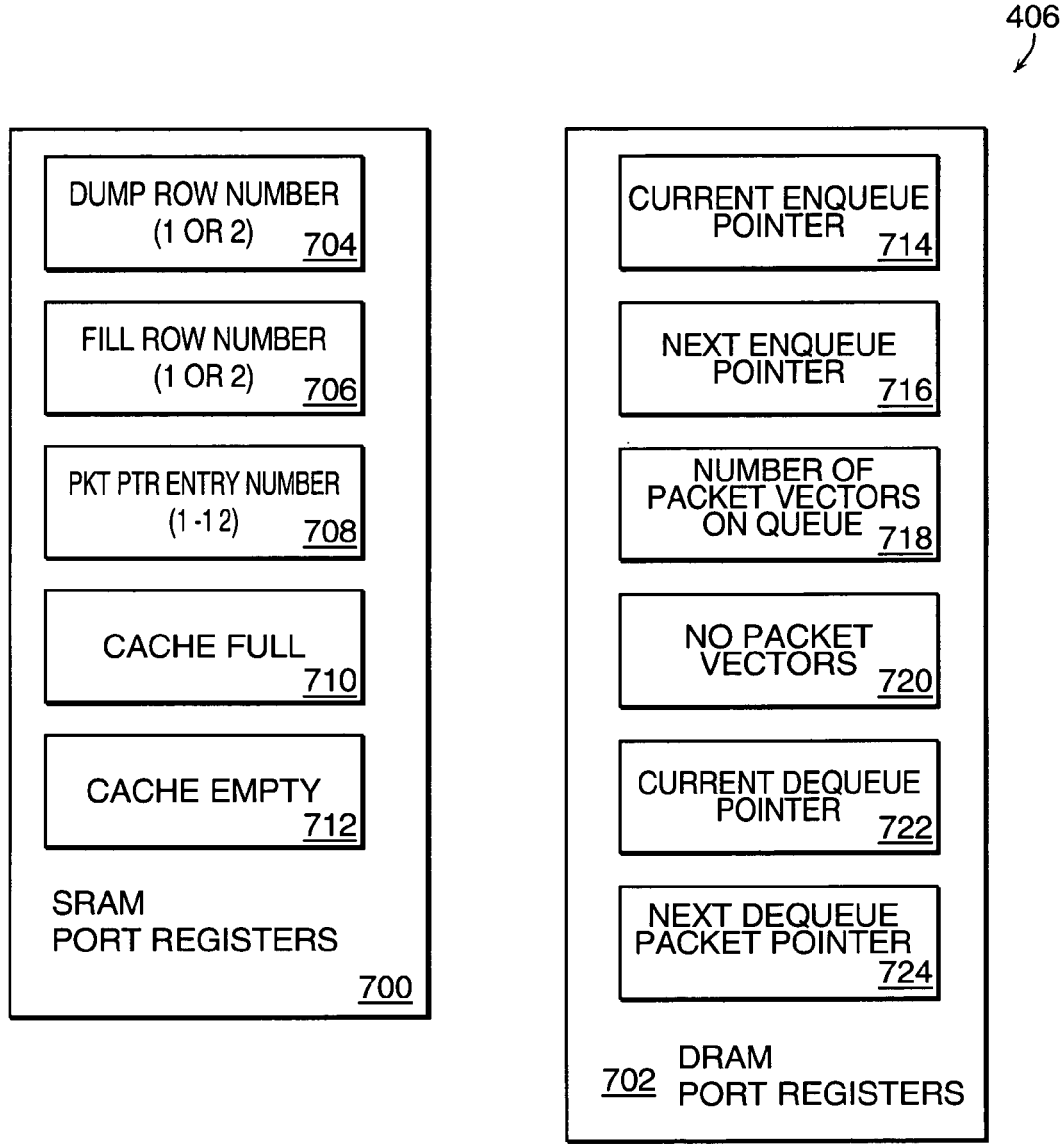
FIG. 7 is a block diagram of the port registers associated with the port queue shown in FIG. 4.

FIG. 7 is a block diagram of the port registers 406 associated with the port queue 124 shown in FIG. 4. The port registers 406 include SRAM port registers 700 and DRAM port registers 702. The SRAM port registers 700 include a dump row number register 704, a fill row number register 706, a packet pointer entry number register 708, a cache full register 710 and a cache empty register 712.

The DRAM port registers 702 include a current enqueue pointer 714, a next enqueue pointer 716, a number of packet vectors on queue register 718, a no packet vectors register 720, a current dequeue pointer register 722, and a next dequeue packet pointer register 724.

The enqueue engine 404 (FIG. 4) uses the contents of the SRAM port registers 700 to determine the packet pointer entry 306 (FIG. 6) in a cache row 304a or 304b in SRAM cache 302 (FIG. 4) in which to enqueue a packet pointer 128. The dump engine 402 (FIG. 4) uses the contents of the SRAM port registers 700 to determine which cache row 304a or 304b in SRAM cache 302 (FIG. 4) from which to transfer the packet pointers 128 to a cache row entry 320 to packet vector DRAM 300 (FIG. 4).

The dump engine 402 (FIG. 4) determines from the contents of the DRAM port registers 702 the location in packet vector DRAM 300 (FIG. 5) of the next packet vector 310 (FIG. 3) to be enqueued. The dequeue engine 400 (FIG. 4) determines from the contents of the DRAM port registers 702 the location in packet vector DRAM 300 (FIG. 5) of the packet vector 310 (FIG. 3) from which to dequeue the next packet pointer 128.

The port registers 406 are described in more detail in conjunction with FIGS. 9A, 9B, 10, and 11.

Figure 8:
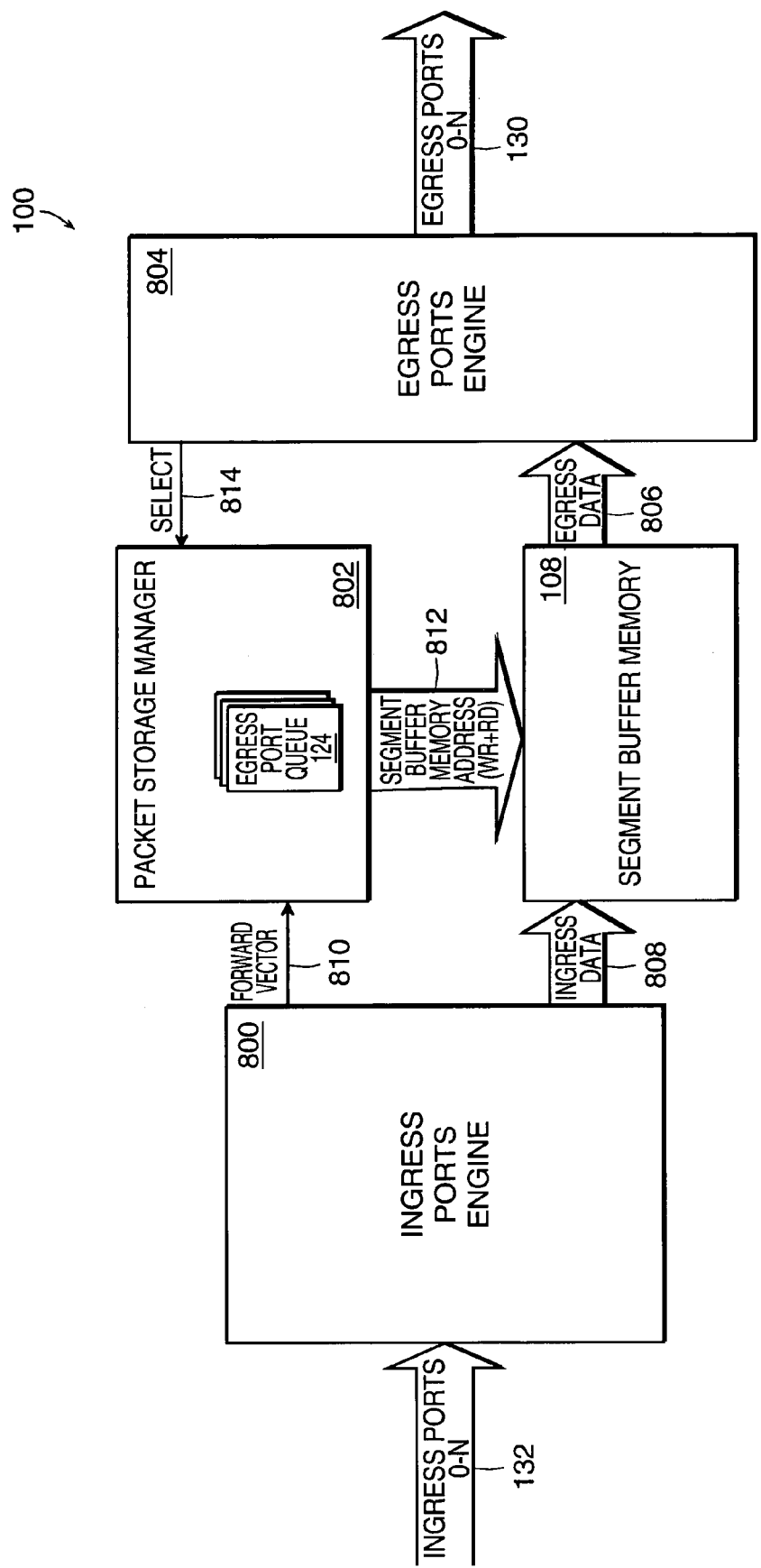
FIG. 8. Is a block diagram of a switch 100 including a forward vector for determining the queue on which to enqueue a packet pointer.

FIG. 8 is a block diagram of a switch 100 including a forward vector 810 for determining the egress port queue 124a–e on which to enqueue a packet pointer 128. The switch 100 includes an ingress ports engine 800, a packet storage manager 802, a segment buffer memory 108, and an egress ports engine 804. A data packet received by the ingress ports engine 800 at an ingress port 132 is forwarded to the packet storage manager 802. The packet storage manager 802 forwards the data packet to segment buffer memory 108 with associated control signals on segment buffer memory address 812. The received data packet forwarded on ingress data 808 by the ingress ports engine 800 is written in segment buffer memory 108 at the location indicated by a packet pointer 128. The writing and reading of data packets in segment buffer memory 108 including the algorithm for locating packets in memory and thus generating pointers is described in co-pending patent application U.S. patent application Ser. No. 09/386,589 filed on Aug. 31, 1999 entitled "Method and apparatus for an Interleaved Non-Blocking Packet Buffer," by David A. Brown, the entire teachings of which are incorporated herein by reference.

After the data packet has been written to segment buffer memory 108, the packet storage manager 802 enqueues the packet pointer 128 in one or more egress port queues 124 dependent on the state of the forward vector 810. The forward vector 810 includes a bit for each egress port in the switch 100. The enqueue engine 404 (FIG. 4) determines the ports on which to enqueue a packet pointer 128 dependent on the state of the corresponding port bit in the forward vector 810.

For example, if the switch has 27 ports, the forward vector 810 is 27-bits wide. If the bit in the forward vector 810 corresponding to an egress port 130 in the switch 100 is set '1' the packet pointer 128 is enqueued in the corresponding egress port queue 124. Alternatively, in an alternative embodiment, if the state of the bit is '0' in the forward vector 810 the packet pointer 128 is enqueued in the corresponding egress port queue 124.

The select signal 814 forwarded from the egress port engine 804 determines from which egress port queue 124, a packet pointer 128 is dequeued. The packet pointer 128 is dequeued and forwarded on segment buffer memory address 812 to read the data packet stored in segment buffer memory 108. The data packet stored at the location in segment buffer memory 108 corresponding to the packet pointer 128 stored in the selected egress port queue 124 is forwarded on egress data 806 to the egress port engine 804. The egress port engine 804 forwards the data packet on the corresponding egress port 130.

Figure 9A:
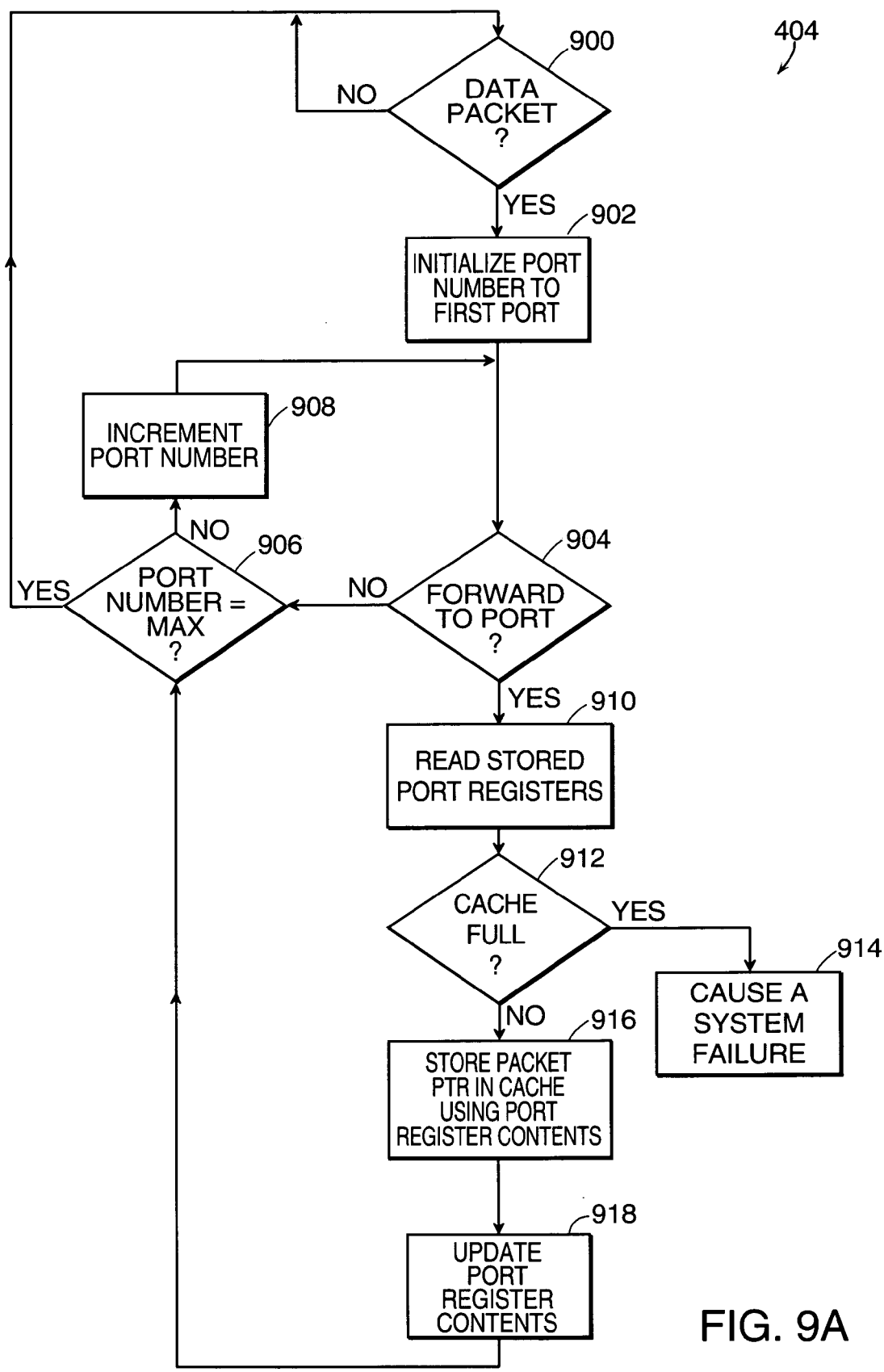
FIG. 9A is a flow chart illustrating the steps performed in the enqueue engine shown in FIG. 4 for enqueuing a packet pointer in a port queue.

FIG. 9A is a flow chart illustrating the steps performed in the enqueue engine 404 shown in FIG. 4 for enqueuing a packet pointer 128 in a port queue 124.

At step 900, the enqueue engine 404 (FIG. 4) determines whether a data packet received at an ingress port 132 (FIG. 1) has been written to segment buffer memory 108 (FIG. 1). If so, processing continues with step 902. If not, processing continues with step 900.

At step 902, the enqueue engine 404 (FIG. 4) initializes a port number variable (not shown) to the first port number in a group of port numbers associated with the enqueue engine 404. The ports associated with the enqueue engine 404 may be all the ports in the switch or a portion of the ports in the switch 100. For example, a 27 port switch (P1–P27) may include four enqueue engines with three of the enqueue engines each enqueuing packet pointers 128 for eight ports (P1–P8, P9–15, P17–24) and the fourth enqueue engine enqueuing packet pointers 128 for three ports (P25–27). The enqueue engine 404 is not limited to eight ports or three ports described; any number of ports may be enqueued by an enqueue engine 404. The memory access time of the SRAM cache 302 determines the number of egress port queues that an enqueue engine 404 can enqueue.

At step 904, the enqueue engine 404 (FIG. 4) determines from the forward vector 810 forwarded from the ingress ports engine 800 whether a packet pointer 128 is to be enqueued in the port queue 124 corresponding to the current port number. If so, processing continues with step 910. If not, processing continues with step 906.

At step 906, the enqueue engine 404 (FIG. 4) determines if the current port is the last port in the group of ports controlled by the enqueue engine 404 (FIG. 4). If so, enqueuing of data packet pointers 128 for the received data packet is complete and processing continues with step 900. If not, processing continues with step 908.

At step 908, the current port number is incremented in order to enqueue the packet pointer 128 in the next egress port queue 124 controlled by the enqueue engine 404. Processing continues with step 904.

At step 910, the enqueue engine 404 (FIG. 4) reads the contents of the port registers 406 (FIG. 4) associated with the current port number. Processing continues with step 912.

At step 912, the enqueue engine 404 (FIG. 4) examines the contents of the cache full register 710 (FIG. 7). If the contents of the cache full register 710 (FIG. 7) indicate that SRAM cache 302 is full; that is cache rows 304*a* and 304*b* for the current port are full, processing continues with step 914. If not, processing continues with step 916.

At step 914, a system failure message is generated because the SRAM cache 302 for the current port is full and no further packet pointers 128 may be enqueued in the egress port queue 124 for the current port.

At step 916, the packet pointer 128 is stored in a packet pointer entry 306 (FIG. 6) in SRAM cache 302 (FIG. 6) for the current port dependent on the contents of the SRAM port registers 700 (FIG. 7). The cache row 304*a* or 304*b* in which to store the packet pointer 128 is dependent on the contents of the fill row number register 706 (FIG. 7), and the packet pointer entry 306 (FIG. 6) in the selected cache row 304*a*–*b* in which to store the packet pointer 128 is dependent on the contents of the packet pointer entry number register 708 (FIG. 7).

The contents of the fill row number register 706 (FIG. 7) are forwarded on enqueue row 422 (FIG. 4) to an SRAM address multiplexer 430 (FIG. 4) and forwarded on cache row 428 (FIG. 4) to the SRAM cache 302 (FIG. 4) dependent on the state of a select signal 432. The state of the select signal 432 (FIG. 4) determines whether SRAM cache 302 (FIG. 4) is being written to enqueue a packet pointer 128 or read to transfer a cache row.

The contents of the packet pointer entry number register 708 (FIG. 7) determine the packet pointer entry 306 in the selected cache row 302 (FIG. 4) in which to store the packet pointer 128. The enqueue engine 404 selects a packet pointer entry 306 dependent on the contents of the packet pointer entry number register 708 (FIG. 7) and forwards the selected packet pointer entry on packet pointer entry enable 420 (FIG. 4) to SRAM cache 302 (FIG. 4). The packet pointer 128 is forwarded on packet pointer data_in 308 to the selected packet pointer entry 306 in SRAM cache 302 (FIG. 4).

Having selected the cache row 304*a*–*b* (FIG. 6) and the packet pointer entry 306 (FIG. 6) in SRAM cache 302 (FIG. 3), the enqueue engine 404 (FIG. 4) enqueues the packet pointer 128 in the egress port queue by writing the packet pointer 128 in the selected packet pointer entry 306 (FIG. 6). Processing continues with step 918.

At step 918, the enqueue engine 404 updates the contents of the SRAM port registers 700 (FIG. 7). The steps to update the contents of the SRAM port registers 700 are described in conjunction with FIG. 9B. After the contents of the SRAM port registers 700 (FIG. 7) are updated, processing continues with step 906.

Figure 9B:
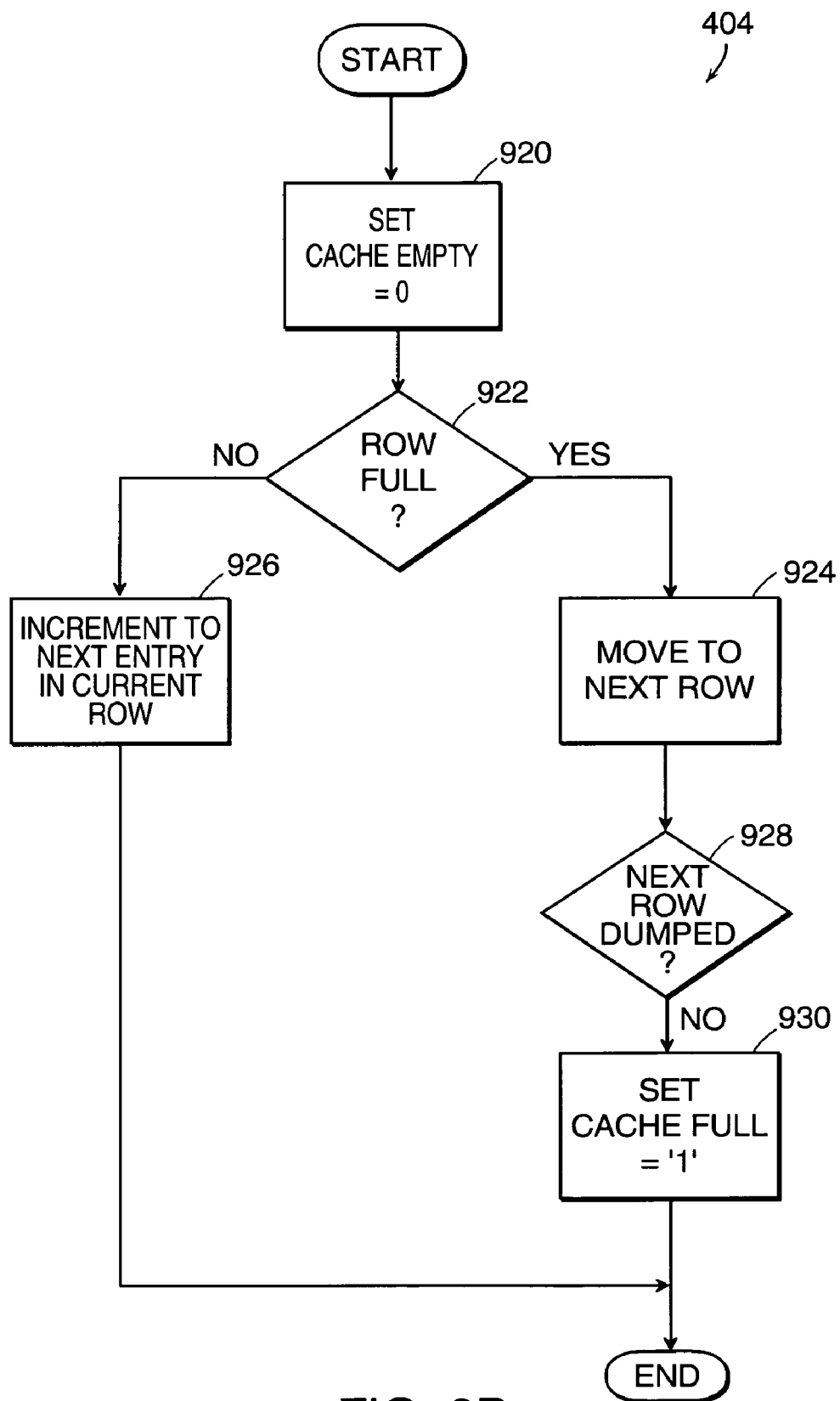
FIG. 9B is a flow chart illustrating the steps performed to update port registers in the enqueue engine shown in FIG. 6.

FIG. 9B is a flow chart illustrating the steps performed to update the SRAM port registers 700 (FIG. 7) by the enqueue engine 404 (FIG. 4).

At step 920, the enqueue engine 404 (FIG. 4) sets the contents of the cache empty register 712 to '0' indicating that the SRAM cache 302 (FIG. 3) is not empty. The cache empty register 712 is monitored by the dump engine 402 to determine if there are packet pointers 128 to be transferred to packet vector DRAM 300. The cache empty register 712 is used if packet vector DRAM 300 is empty in order to determine if there are packet pointers 128 stored in SRAM cache 302. If the SRAM cache 302 is not empty, the packet pointer 128 may be moved to packet vector DRAM 300 before a cache row 304*a* or 304*b* is full in order to reduce the latency incurred by the switch 100 in forwarding a data packet 126 from an ingress port 132 (FIG. 1) to an egress port 130*a*–*e* (FIG. 1). Processing continues with step 922.

At step 922, the enqueue engine 404 (FIG. 4) determines from the contents of the packet pointer entry number register 708 (FIG. 7) whether the current row is full. If so, processing continues with step 924. If not, processing continues with step 926.

At step 924, the enqueue engine 404 (FIG. 4) toggles the state of the contents of the fill row number register 706 (FIG. 7) to move to the next cache row 304*a* or 304*b* (FIG. 6) processing continues with step 928.

At step 926, the enqueue engine 404 (FIG. 4) increments the contents of the packet pointer entry number register 708 (FIG. 7) in the current cache row 304*a* or 304*b* (FIG. 6).

At step 928, the enqueue engine 404 (FIG. 4) determines from the contents of dump row number register 704 (FIG. 7) if the next row has been transferred by comparing the contents of dump row number register 704 (FIG. 7) and the fill row number register 706 (FIG. 7). If the contents are the same, the current row has not been transferred yet. If the current row has not been transferred, the enqueue engine 404

(FIG. 4) sets the contents of the cache full register 710 (FIG. 7) to '1'. The contents of the cache full register 710 are monitored by the dump engine 402 to determine if there is a cache row 304a or 304b to be transferred to packet vector DRAM 300.

Figure 10:
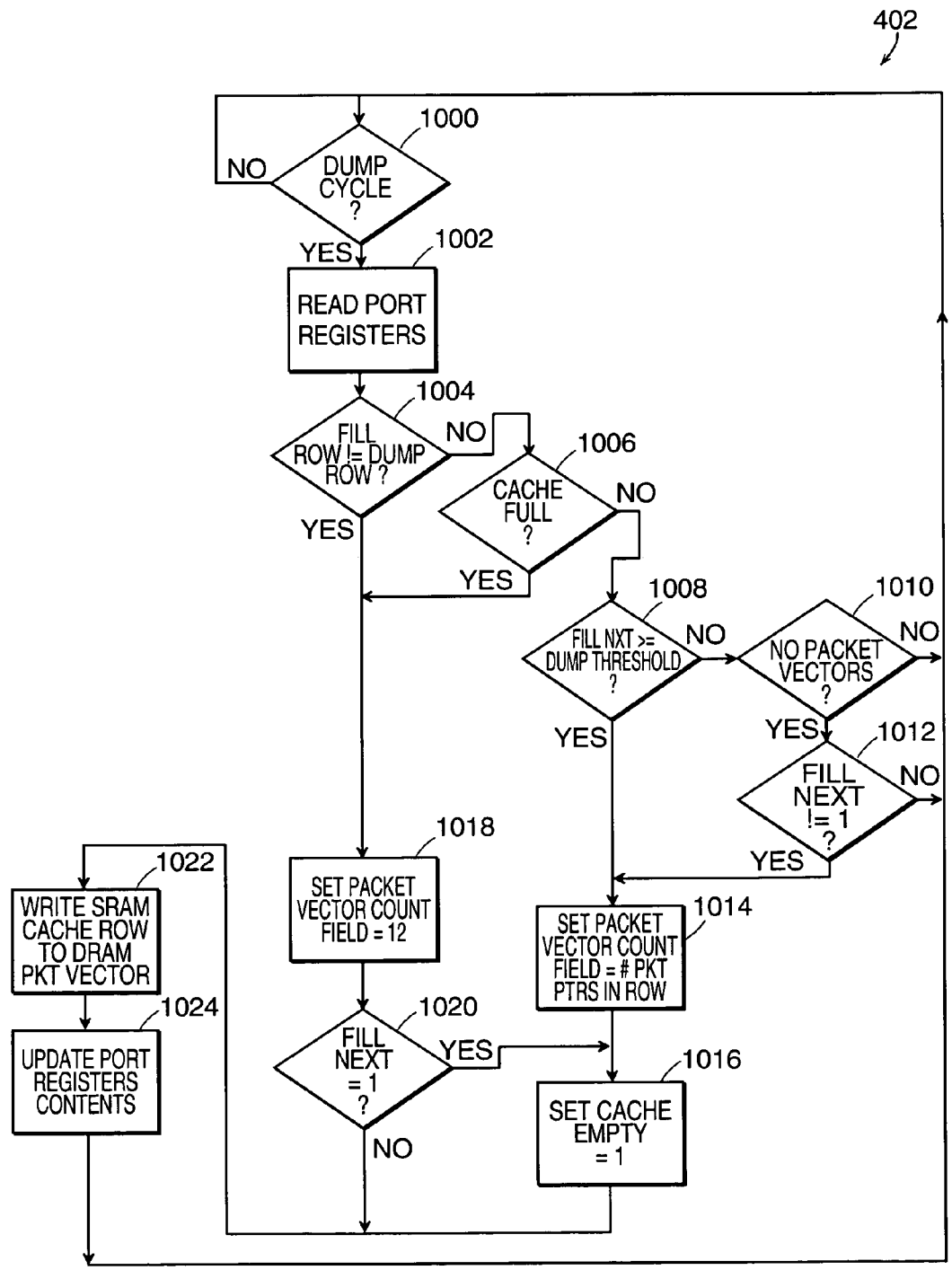
FIG. 10 is a flow chart illustrating the steps performed in the dump engine shown in FIG. 6 for transferring a cache row from SRAM cache to packet vector DRAM.

FIG. 10 is a flow chart illustrating the steps performed in the dump engine 402 shown in FIG. 4 for transferring a cache row 304 (FIG. 6) from SRAM cache 302 (FIG. 3) to a packet vector 310 (FIG. 5) in packet vector DRAM 300 (FIG. 5). The dump engine 402 also adds the packet vector 310 in which the transferred cache row 304a or 304b is stored to the linked list of packet vectors 310 stored in packet vector DRAM 300 (FIG. 5) for the egress queue 124a–e.

At step 1000, the dump engine 402 (FIG. 4) determines if a transfer cycle may be started. If so, processing continues with step 1002.

At step 1002, the dump engine 402 (FIG. 4) reads the SRAM port registers 700 (FIG. 7) and the DRAM port registers 702 (FIG. 7) corresponding to the port queue for the current port. Processing continues with step 1004.

At step 1004, the dump engine 402 (FIG. 4) determines if the contents of dump row number register 704 (FIG. 7) are not equal to the contents of the fill row number register 706 (FIG. 7). If so, processing continues with step 1018. If not, processing continues with step 1006.

At step 1006, the dump engine 402 (FIG. 4) determines if the cache is full from the contents of the cache full register 710 (FIG. 7). If the cache is full, processing continues with step 1018. If not, processing continues with step 1008.

At step 1008, the dump engine 402 (FIG. 4) determines from the contents of the packet pointer entry number register 708 (FIG. 7) if the number of packet pointers stored in cache row 304a or 304b is greater than a predefined transfer threshold. If so, processing continues with step 1014. If not, processing continues with step 1010.

At step 1010, the dump engine 402 (FIG. 4) determines from the contents of the no packet vectors register 720 (FIG. 7) if there are packet vectors 310 (FIG. 3) stored in packet vector DRAM 300 (FIG. 3) for the current port. If so, processing continues with step 1012. If not, processing continues with step 1000.

At step 1012, the dump engine 402 (FIG. 4) determines from the contents of the packet pointer entry number register 708 (FIG. 7) if there are packet pointer entries 306 (FIG. 3) stored in the current row. If so, processing continues with step 1014. If not, processing continues with step 1000.

At step 1014, the dump engine 402 (FIG. 4) sets the count field 318 (FIG. 3) in the next available packet vector 310 (FIG. 3) in packet vector DRAM 300 (FIG. 3) to the number of packet pointers 128 written in the partially filled cache row 304a or 304b (FIG. 3) to be transferred to packet vector DRAM 300 (FIG. 3). The contents of the fill row number register 706 (FIG. 7) are toggled to the next cache row number. For example, if the current cache row number is 1, the contents of the fill row number register 706 (FIG. 7) are toggled to '2'. The contents of the packet pointer entry number register 708 are initialized to '1'. Processing continues with step 1016.

At step 1016, the dump engine 402 (FIG. 4) sets the cache empty register 712 (FIG. 7) to '1' indicating that the SRAM cache 302 (FIG. 3) is empty. Processing continues with step 1022.

At step 1018, the dump engine 402 (FIG. 4) sets the count field 318 (FIG. 3) in the next available packet vector 310 (FIG. 3) in packet vector DRAM 300 (FIG. 3) to 12 (the maximum number of packet pointers 128 stored in packet pointer entries 306 (FIG. 3) in a cache row 304a or 304b (FIG. 3)). Processing continues with step 1016.

At step 1020, the dump engine 402 (FIG. 4) reads the contents of the packet pointer entry number 708 (FIG. 7). If the contents are set to the first packet entry (packet entry 1), processing continues with step 1016 which has previously been described. If not, processing continues with step 1022.

At step 1022, the dump engine 402 (FIG. 4) transfers the contents of the cache row 304a–b (FIG. 4) selected by the dump row number register 704 (FIG. 7) into the current packet vector 310 (FIG. 3) in packet vector DRAM 300 (FIG. 3). The address of the current packet vector is stored in the current enqueue pointer 714 (FIG. 7) in DRAM port registers 702 (FIG. 7). The selected cache row 304a–b (FIG. 3) is transferred by reading the contents of the cache row 304a or 304b (FIG. 3) in SRAM cache 300 (FIG. 3) and writing the contents to a cache row entry 320 (FIG. 3) in the current packet vector 310 (FIG. 3) in packet vector DRAM 300 (FIG. 3). In the same packet vector DRAM access, the address of the next packet vector stored in the next enqueue pointer register 716 (FIG. 7) in the DRAM port registers 702 (FIG. 7) is written to the link field 316 (FIG. 3) of the current packet vector 310 and the count of the number of packet pointers stored in the cache row 304a or 304b is written to the count field 318 (FIG. 3). Processing continues with step 1024.

At step 1024, the contents of the SRAM port registers 700 and DRAM port registers 702 (FIG. 7) are updated as follows: the current enqueue pointer register 714 (FIG. 7) contents are set to the contents of the next enqueue pointer 716. A next enqueue pointer obtained from a free list of pointers (not shown) is stored in the next enqueue pointer register 716 (FIG. 7). The cache full register 710 is set to not full. The no packet vectors register 720 (FIG. 7) is set to '0' and the dump row number register 704 FIG. 7) is changed to the number of the next cache row 304a–b (FIG. 7) to be transferred.

Figure 11:
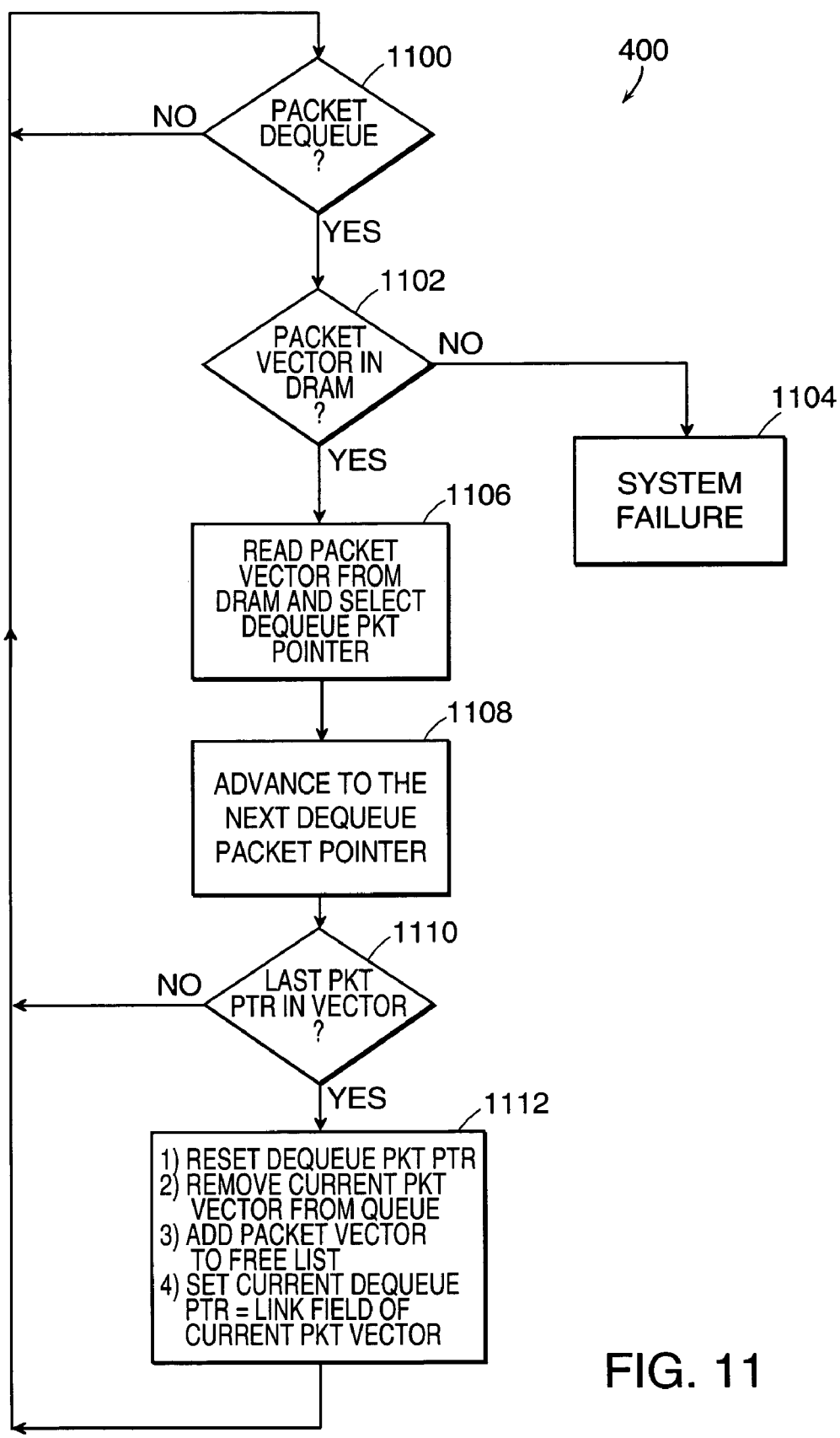
FIG. 11 is a flow chart illustrating the steps performed in the dequeue engine shown in FIG. 6 for dequeuing a packet pointer from a port queue.

FIG. 11 is a flow chart illustrating the steps performed in the dequeue engine 400 shown in FIG. 4 for dequeuing a packet pointer 128 from a port queue 124.

At step 1100, the dequeue engine 400 determines if a packet pointer 128 should be dequeued. If so, processing continues with step 1102. If not, processing continues with step 1100.

At step 1102, the dequeue engine 400 (FIG. 4) reads the contents of the no packet vectors register 720 (FIG. 7). The contents of the no packet vectors register 720 indicate whether there is a packet vector available. If no packet vectors are available, processing continues with step 1104. If packet vectors are available, processing continues with step 1106.

At step 1104, a system failure is generated because there are no packet vectors available. Processing is complete.

At step 1106, the dequeue engine 400 reads the packet vector 310 (FIG. 3) from packet vector DRAM 300 (FIG. 3) at the address in packet vector DRAM 300 (FIG. 3) stored in the current dequeue pointer register 722 (FIG. 7). The current packet pointer entry 306 (FIG. 3) in the current dequeue packet vector 310 is selected dependent on the contents of the next dequeue packet pointer register 724 (FIG. 7). The selected packet pointer 128 (FIG. 1) is forwarded on packet pointer data out 322. Processing continues with step 1108.

At step 1108, the contents of the next dequeue packet pointer register 724 are incremented to point to the next packet pointer entry 306 (FIG. 3) in the current dequeue packet vector 310 (FIG. 3). Processing continues with step 1110.

At step 1110, the dequeue engine 400 (FIG. 4) determines by comparing the contents of the next dequeue packet pointer register 724 (FIG. 7) with the count field 318 in the current dequeue packet vector 310 if the current packet pointer entry 306 stores the last packet pointer 128 in the current dequeue packet vector 310. If so, processing continues with step 1112. If not, processing continues with step 1100.

At step 1112, the dequeue engine 400 (FIG. 4) sets the contents of the next dequeue packet pointer 724 (FIG. 7) to '1' to select the first packet pointer entry 306 in a packet vector, removes the current packet vector from the linked list of packet vectors in packet vector DRAM 300, returns the current dequeue packet vector 310 to a free list of packet vectors (not shown) and sets the contents of the current dequeue pointer register 722 to the contents of the link field 316 in the current dequeued packet vector 310 (FIG. 3). Processing continues with step 1100.

While this invention has been particularly shown and described with references to preferred embodiments thereof, it will be understood by those skilled in the art that various changes in form and details may be made therein without departing from the scope of the invention encompassed by the appended claims.

The invention claimed is:

1. A method of processing data packets in a switch comprising the steps of:
   receiving data packets on an ingress port of the switch and writing the data packets to buffer memory of the switch;
   writing in a first memory of an egress port of the switch, a plurality of pointers pointing to the data packets in the buffer memory, the first memory having a first memory access time;
   establishing a linked list by transferring, in a single transfer cycle, the plurality of pointers to a second memory of the egress port, the second memory having a second memory access time that is significantly slower than the first memory access time; and
   dequeuing each pointer from the second memory and forwarding the corresponding data packet from the egress port.

2. A queuing method as claimed in claim 1 wherein the step of writing writes each pointer in a single write operation to the first memory.

3. A queuing method as claimed in claim 1 wherein the step of transferring forwards a full cache row into the second memory.

4. A queuing method as claimed in claim 3 wherein the cache row is transferred in a single write cycle.

5. A queuing method as claimed in claim 1 wherein the step of transferring forwards a partially filled cache row into the second memory.

6. A queuing method as claimed in claim 5 wherein the cache row is transferred in single write cycle.

7. A queuing method as claimed in claim 1 wherein entries in a cache row in first memory are ordered by position in the cache row.

8. A queuing method as claimed in claim 1 wherein the first memory includes two cache rows.

9. A queuing method as claimed in claim 1 wherein a packet vector stored in the second memory includes a cache row and a count of the number of pointers stored in the cache row.

10. A queuing method as claimed in claim 9 wherein a packet vector stored in the second memory includes a link to a next packet vector.

11. A queuing method as claimed in claim 1 wherein a packet vector stored in the second memory includes a link to a next packet vector.

12. A queuing method as claimed in claim 1 wherein the plurality of pointers are packet pointers.

13. A queuing method as claimed in claim 1 wherein at least one of the plurality of pointers is written into an egress port queue.

14. A queuing method as claimed in claim 1 wherein each pointer is determined from a packet header of a data packet.

* * * * *